United States Patent [19]

Busse et al.

[11] 4,139,091
[45] Feb. 13, 1979

[54] TRANSPORT DEVICE FOR THE FILTER PLATES OF A FILTER PRESS

[75] Inventors: Oswald Busse; Hugo Klesper, both of Aarbergen, Fed. Rep. of Germany

[73] Assignee: Passavant-Werke Michelbacher Hutte, Fed. Rep. of Germany

[21] Appl. No.: 798,574

[22] Filed: May 19, 1977

[30] Foreign Application Priority Data

May 28, 1976 [DE] Fed. Rep. of Germany ....... 2624143

[51] Int. Cl.$^2$ ............................................ B65G 19/26
[52] U.S. Cl. ..................... 198/732; 104/162; 104/172 S; 198/733; 198/748; 198/749
[58] Field of Search ............... 198/746, 747, 748, 460, 198/749, 736, 732, 733; 104/162, 172 S

[56] References Cited

U.S. PATENT DOCUMENTS 3,667,399 6/1972 Czarnecki .................. 104/172 S

FOREIGN PATENT DOCUMENTS 1151965 5/1969 United Kingdom ................ 104/172 S Primary Examiner—Robert B. Reeves
Assistant Examiner—Douglas D. Watts
Attorney, Agent, or Firm—Woodford R. Thompson, Jr.

[57] ABSTRACT

A transport device for displacement of filter plates embodying a transport pawl pivotally mounted on a drawing element disposed to move the plates in the direction of opening. The pawl has a recess which cooperates with upwardly extending catches and a forward deflector surface which cooperates with the catch of an adjacent plate in a stack of plates to prevent the pawl from dropping into operative position. At least one additional pawl is pivotally mounted on the drawing element and has an additional deflector surface rearwardly of the recess therein which cooperates with the catch of an adjacent plate. The recess in the pawl may be of a length to engage two catches carried by two adjacent plates.

3 Claims, 3 Drawing Figures

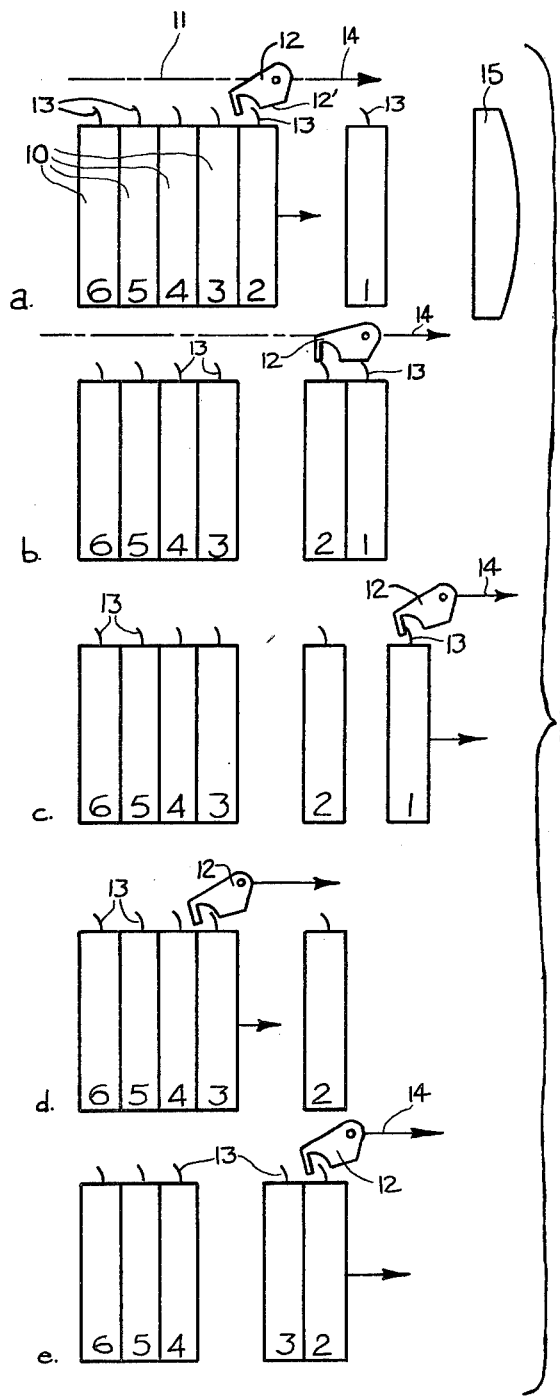
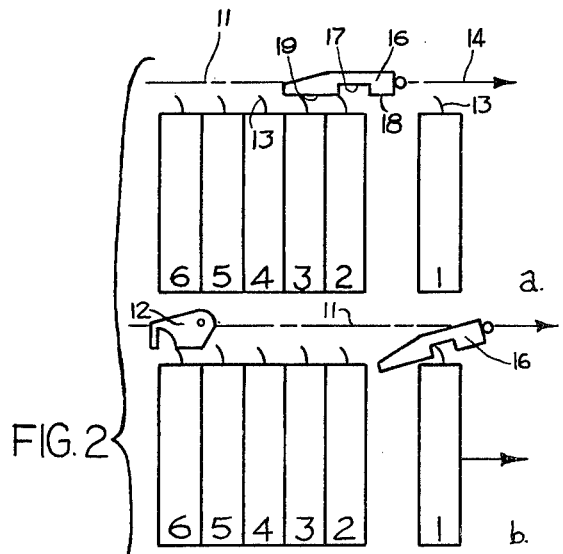
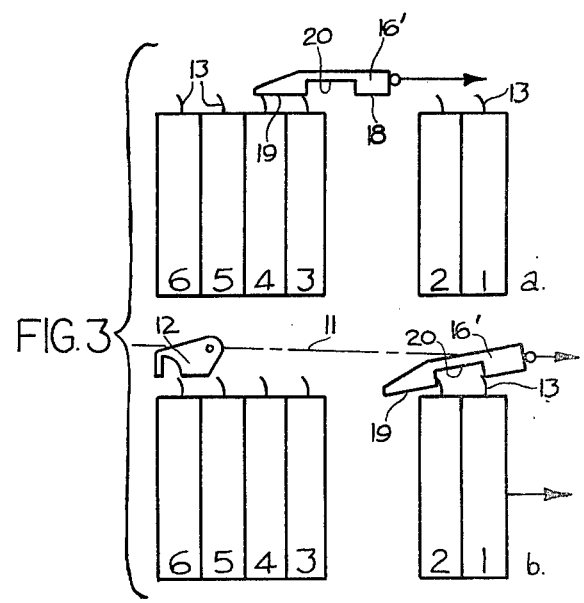
FIG. 1
FIG. 2
FIG. 3

TRANSPORT DEVICE FOR THE FILTER PLATES OF A FILTER PRESS

BACKGROUND OF THE INVENTION

This invention relates to a transport device for moving the displaceable filter plates of a plate filter press with said transport device embodying at least one transport pawl which is pivotally supported on a drawing element driven to move above the filter plates in the direction of opening movement and which has a hook-shaped recess cooperating with upwardly projecting catches on the filter plates. Also, a deflector surface is so arranged on the pawl as to precede the recess therein relative to its direction of movement and engage the catch of an adjacent preceding filter plate and thereby prevent the pawl from operating.

Such prior art devices are employed, when the filter press has been unlocked, to consecutively pull the plates apart, so that the space between adjacent filter plates becomes accessible, the cake can be removed and the filter cloth can be cleaned. During this operation, it sometimes happens that a filter plate suddenly detaches itself from the stack of plates and moves in the direction of opening to come to a standstill in spaced relation to the stack of plates. Such an odd plate is an obstacle for the movement of other plates still to be moved, because the plate next in line on being moved will collide with the odd plate and be released by the pawl which will then grip the odd plate and remove it, and this will go on until the whole stack of plates has been removed. The shocks caused by the colliding plates and the swift engagement and disengagement of the pawl has a negative effect on the service life of plates and transport elements.

SUMMARY OF THE INVENTION

In accordance with our present invention we provide an improvement to conventional apparatus wherein odd plates having detached themselves from the set of plates at any given location may be removed properly and in proper order.

This object is realized in accordance with our invention by providing at least one additional pawl which is pivotally connected to the drawing device and is provided with an additional deflector surface rearwardly of its hook-shaped recess as viewed in the direction of plate movement and cooperates with the upwardly projecting catch of an adjacent plate.

An additional pawl is thus provided which has deflector surfaces extending from both sides of the recess therein whereby the additional pawl overrides the stack of plates without engaging any of the plates therein but engages the catch of any odd, detached plate and removes this obstacle. A conventional transport pawl is not equipped to do this, because when it approaches the odd plate it has already removed a plate from the stack which it then has to release.

We have found that it would be sufficient to equip the device with only one such additional pawl, however, if the drawing element, as is well known, carries several transport pawls spaced a distance from one another, it is advantageous according to our invention to provide an additional pawl in front of each conventional transport pawl.

It may sometimes happen that not only one but two filter plates detach themselves from the stack of plates. But even this problem can be solved in accordance with one embodiment of our present invention wherein every one or every second one of the additional pawls has a recess large enough as viewed in the direction of movement to engage the catches of two adjacent filter plates.

DESCRIPTION OF THE DRAWING

Our invention will now be described more in detail, reference being had to the accompanying drawing wherein:

FIG. 1 is a schematic representation showing a conventional transport device in various phases of transport indicated at a, b, c, d and e;

FIG. 2 is a schematic representation showing one embodiment according to the present invention during the respective phases of transport indicated at a, b and c; and, FIG. 3 is a schematic representation showing another embodiment of the present invention in two of the phases of transport indicated at a and b.

DETAILED DESCRIPTION

Mounted above the filter plates indicated generally at 10 in FIG. 1, is a conventional drawing element in the form of a transport chain, indicated in broken lines at 11, having a transport pawl 12 pivotally mounted thereon. The pawl 12 cooperates with catches 13 arranged on the filter plates to thus move the plates in the direction indicated by arrow 14 towards the open head plate indicated at 15 for the purpose of filter cake removal and/or flushing of filter cloth. The transport pawl 12 has the usual downwardly opening hook-shaped recess preceded by a deflector surface 12'. The deflector surface 12' prevents the pawl 12 from engaging the catch 13 of a plate 10 if such plate is preceded in the direction of movement, toward the right in FIG. 1, by another plate 10. Accordingly, the pawl 12 during every operation will remove the frontmost plate 10 of a set of closed filter plates.

In the drawing we show six individual filter plates 10 with such plates being numbered consecutively from the frontmost plate to the rearmost plate by the numerals 1, 2, 3, 4, 5 and 6, respectively. From the foregoing, it will be seen that if the frontmost plate 1 in a stack of plates detaches itself and rolls a certain distance away from the stack, as shown in FIG. 1a, the transport pawl 12 will engage the catch of plate 2 and move plate 2 until it collides with plate 1. The catch 13 of plate 1 when contacting the deflector surface 12' of the pawl 12 lifts the pawl 12 off plate 2 as shown in FIG. 1b. The pawl 12 then drops onto the catch 13 of plate 1 and removes plate 1 after it releases plate 2 as shown in FIG. 1c. The same happens at every operation of the pawl 12 or any additional pawl, as shown by the example of plates 2 and 3 in FIGS. 1d and 1e. This means that every plate on its course will meet with an obstacle.

In accordance with our embodiment shown in FIG. 2, this disadvantage is obviated in that an additional transport pawl 16 is mounted on chain 11. In addition to a deflector surface 18 located in front of a downwardly opening recess 17, the pawl 16 has a second deflector surface 19 rearwardly of the recess 17. The deflector surface 19 may be provided on the underside of an extended nose, as shown. The deflector surface 19 is of a length to extend over and rest on the catch 13 of plate 3 when the recess 17 is above plate 2. The deflector surface 19 thereby prevents the pawl 16 from dropping into place over a catch 13 of a filter plate so long as the plate remains in the stack, which also includes the last plate in the stack. This being so, the transport pawl 16 overrides the stack of plates, as shown in FIG. 2a, and engages only the odd plate 1 which has detached itself. The pawl 16 then pulls plate 1 away, as shown in FIG. 2b. In contrast to the situation represented in FIG. 1b and FIG. 1c, the transport pawl 16 will not move a second plate up to plate 1 and leave it there but will remove the obstacle presented by the odd plate 1. Accordingly, the conventional transport pawl 12 following on the chain 11 can pull away plate 2 and move it along the transport path without being hindered.

In the embodiment shown in FIG. 3, we show an additional transport pawl 16' which is also provided with the deflector surfaces 18 and 19. The pawl 16' has a particularly long recess 20 therein between the deflector surfaces 18 and 19 that can engage two catches 13 carried by two adjacent plates, as shown. Pawl 16 is thus adapted to remove an obstacle formed by two adjacent plates 1 and 2 sticking together and having moved away from the stack as illustrated in FIG. 3b. This is a situation that could not be coped with by the transport pawl 16 as illustrated in FIG. 2. A further advantage lies in the fact that the transport pawl 16' with the longer recess 20, as shown in FIG. 3, can also remove single odd plates having detached themselves from the stack of plates.

What we claim is:

1. Transport device for the displacement of filter plates movably mounted in a filter press, comprising at least one transport pawl pivotally mounted on a drawing element which is driven to move above said plates in the direction of opening with said pawl comprising a hook-shaped recess cooperating with upwardly extending catch elements on said filter plates and a forward deflector surface in front of said recess as viewed in the direction of movement cooperating with the catch element of an adjacent plate in a stack of plates and thereby preventing said pawl from dropping into position for its recess to receive a catch element until said recess reaches the catch element of the forwardmost plate in said stack of plates, the improvement in said transport device comprising, at least one additional transport pawl pivotally mounted on said drawing element and having said forward deflector surface in front of said recess and an additional deflector surface located rearwardly of said recess, as viewed in the direction of movement, with said additional deflector surface being of a length at least as great as the distance between the catch elements of two of said plates mounted adjacent each other and being in position to cooperate with the catch element of the fiter plate adjacent and rearwardly of said forwardmost plate in said stack of plates so that said recess in said additional transport pawl cannot receive the catch element of said forwardmost plate in said stack of plates.

2. A device as defined in claim 1 in which each one of a plurality of transport pawls mounted in spaced relationship on said drawing element is preceded in spaced relation by said additional transport pawl.

3. A device as defined in claim 1 in which said recess in said additional pawl is of a length to engage two catch elements carried by two adjacent plates.

* * * * *